US006002560A

United States Patent [19]

Nguyen et al.

[11] Patent Number: 6,002,560

[45] Date of Patent: Dec. 14, 1999

[54] CIRCUIT BREAKER CONTACT WEAR INDICATOR

[75] Inventors: Truc Trantrung Nguyen, Pittsburgh; Ronald William Crookston, Trafford; Alan Kent Edmunds, Bellevue, all of Pa.

[73] Assignee: Eaton Corporation, Cleveland, Ohio

[21] Appl. No.: 09/145,676

[22] Filed: Sep. 2, 1998

[51] Int. Cl.[6] ....................................................... H02H 3/00

[52] U.S. Cl. ................................ 361/23; 361/78; 361/115

[58] Field of Search ................................ 361/93, 115, 70, 361/71, 72, 78, 23

[56] References Cited

U.S. PATENT DOCUMENTS 3,925,722 12/1975 Fohrhaltz .................................. 324/28

4,743,876 5/1988 Milianowicz et al. .................... 335/20

5,095,293 3/1992 Patel et al. ................................ 335/17

*Primary Examiner*—Stephen W. Jackson

*Attorney, Agent, or Firm*—Martin J. Moran

[57] ABSTRACT

A visible erosion indicator is provided to determine the condition of contacts inside a vacuum interrupter. The visual indicator is located on a portion of an extension of the moveable contact drive stem which is a threaded stud. The indicator is formed from a flexible member that is screwed onto the stud until a given extent of the flexible member protrudes beyond the bottom pan of the circuit breaker, that the moveable contact stem traverses during opening and closure of the internal contacts within the vacuum interrupter. The extension of the wear indicator is measured with the circuit breaker in the closed position to provide an accurate measure of contact wear. The flexible property of the wear indicator enables it to clear obstructions as the breaker drawer is moved within the breaker enclosure.

11 Claims, 5 Drawing Sheets

CIRCUIT BREAKER CONTACT WEAR INDICATOR

BACKGROUND OF THE INVENTION

1. Field of the Invention

This invention relates in general to an apparatus for providing a visual indicia of the state of contacts of an interrupter assembly of a circuit breaker where the contacts are not readily visible, and more particularly to a compact circuit breaker assembly that houses the interrupter contacts in a hermetically sealed housing.

2. Background Information

Circuit breakers provide protection for electrical systems from electrical fault conditions such as current overloads, short circuits, and low level voltage conditions. Typically, circuit breakers include a spring-powered operating mechanism which opens electrical contacts to interrupt the current through the conductors in an electrical system in response to abnormal conditions. In particular, vacuum circuit interrupter apparatus have been known which include separable main contacts disposed within an insulated and hermetically sealed housing. Generally, one of the contacts is fixed relative to both the housing and to an external electrical conductor which is interconnected with the circuit to be controlled by the circuit interrupter. The other contact is moveable. In the case of a vacuum circuit interrupter, the moveable contact assembly usually comprises a stem of circular cross-section having the contact at one end enclosed within the vacuum chamber, and a driving mechanism at the other end which is external to the vacuum chamber. In one type of vacuum interrupter, an operating rod assembly is provided which carries a rotatable contact bell crank which is slidable on the operating rod and rotates about a pivot pin upon motion of the operating rod. This plate is connected to the stem of the moveable contacts. The stem is typically affixed to a bellows seal which maintains the vacuum environment within the chamber while enabling movement of the stem and thus the moveable contact. Motion of the plate causes motion of the moveable contact into or out of engagement with the fixed contact.

The operating rod assembly is operatively connected to a latchable operating mechanism which is responsive to current. When an abnormal condition is reached, the latchable operating mechanism becomes unlatched which causes the operating rod to move to the open position. The motion of the operating rod, in turn, causes the contact bell crank to rotate and, as discussed above, this controls motion of the moveable contact.

Compression springs are provided in the operating rod assembly in order to be able to separate the moveable contact from the fixed contact and to ensure the necessary force so that the contacts will not accidentally open in inappropriate conditions. In addition, when appropriate circumstances requiring interruption of the circuit do arise, an adequate force is needed to open the contacts with sufficient speed. If the contacts do not open quickly, there is a risk of failure to interrupt the current.

In order to achieve the adequate interrupt speed and force, the springs are mounted on the operating rod assembly. The springs are typically mounted towards one end of the operating rod on what is referred to as the contact wipe portion of the operating rod assembly. Contact wipe is a measure of the force required to hold the vacuum interrupter contacts closed and the energy to force the contacts open with sufficient speed for safe and clean interruption as discussed above. As noted above, the contact springs which comprise part of the contact wipe assembly must provide the force to hold the contacts closed and the energy to pry them open with appropriate speed. Therefore, if such springs are compression springs as is typically the case, it is important that the springs have sufficient compression during operation. On the other hand, if tension springs are utilized, adequate tension must exist.

In a typical case, the spring is held on the operating rod between a disk-spacer member which is carried along by the operating rod and a shoulder portion of a set of contact wipe plates which are mounted at one end of the operating rod and spaced apart from the spacer member. When the contacts are closed, the operating rod travels toward its closed position. The contact wipe plates are slidable mounted on the operating rod at the same point at which the rotatable contact belt crank is mounted. When the contacts seat, motion of the contact wipe plates stop. However, motion of the operating rod continues until it travels to its full extended position. At this point, the spring is fully compressed between the spacer member and the shoulder section of the contact wipe plates.

U.S. Pat. No. 5,095,293, assigned to the assignee of the subject invention, appears to describe the first known method of visually checking (without measurements) the spring compression (or tension) to determine whether it is adequate. Adequate spring compression is, in one respect, an indication of the contacts being in good condition. This is because contacts which are worn would require a greater degree of travel by the contact wipe plates which would mean that the compression of the springs between the shoulder portion of the contact wipe plates and the disk-shaped spacer would not be as great. U.S. Pat. No. 5,095,293, issued Mar. 10, 1992 and cited above, describes a convenient and easy to use inspection apparatus for use with the contact wipe springs from which the compression of the springs can be visually inspected. This serves as an indication of the correct contact force and indirectly provides an indication of the integrity of the contacts without requiring disassembly of the circuit breaker or any portion of it. The inspection apparatus employs an operating rod extension tongue received between the contact wipe plates. A visual indicia of the degree of motion between the contact wipe plates and the extension tongue of the operating rod provides a reading of adequacy of spring compression which, in turn, indirectly relates to the integrity of the contacts of the breaker.

While this indicia of contact wear functions well in the prior art vacuum interrupter design illustrated in FIG. 1, more recent larger, higher voltage, more compact vacuum interrupter designs have found that extensions of the operating rods are not readily visible outside the housing designs of these new breakers and any rigid extension of the moveable contact stem caused interference with the secondary contacts and levering components of the breaker insertion system. Molded insulation casings housing these larger designs have, in general, made it more difficult to observe the moveable operating components within the high voltage portion of the breaker. Accordingly, an improved indicia of contact wear is desired that is more readily visible to maintenance personnel and will not interfere with the other operating components associated with the circuit interrupter nor inhibit replacement of the vacuum interrupter when it has expended its useful life.

SUMMARY OF THE INVENTION

The invention provides particular benefit to a circuit interrupter having a stationary and linearly moveable contact, subject to wear, which is enclosed within a sealed housing that does not readily permit inspection of the contacts and where the moveable contact includes a drive stem that is mounted through the housing in a manner that permits movement along its longitudinal axis such as through the use of a bellows seal. A flexible member of this invention is attached to the end of the drive stem protruding through the housing. When the contacts are new and are in the closed position the flexible member extends past a reference point a distance equal to the tolerance specifications for the contacts, approximately 3 mm, so that when the contacts are worn past the manufacturer's recommended specifications, the flexible member is at or below the reference when the contacts are in the closed condition. In the preferred embodiment, the flexible member is a spring which attaches to a threaded stud at the end of the contact drive stem and the reference gauge is the bottom pan of the circuit interrupter.

Since the threaded stud is directly and solidly connected to the moving contact stem, an accurate and reliable reading is obtained. As the circuit interrupter is moved into and out of the breaker enclosure for maintenance or other purposes, the interrupter will normally be in the open position which means the erosion indicator of this invention protrudes further below the bottom of the pan than it would with the contacts in a closed condition, approximately 19.1 mm, and will normally interfere with the secondary contacts and levering in components of the breaker closure system, which effect the insertion and removal of the breaker drawer. However, the flexible nature of the erosion indicator of this invention enables it to bend out of the way of the obstructing components and return to its original position when clearance is provided. The erosion indicator is preferably clamped to the drive stem to maintain its calibration. Thus, the invention enables a more compact and fully insulated circuit breaker configuration with contact erosion measurement capability available exterior of the breaker housing.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
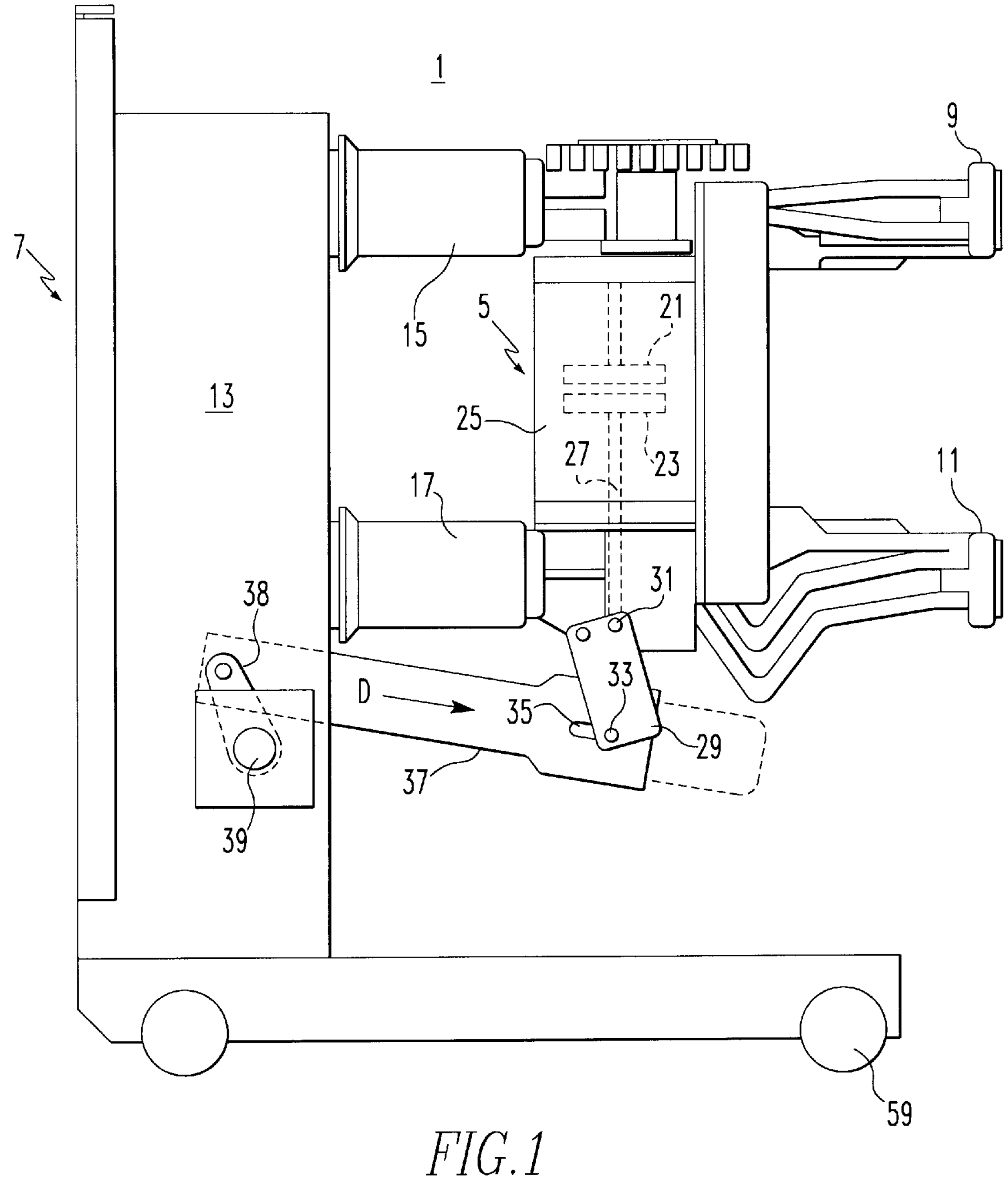
FIG.1 (PRIOR ART)
FIG. 1 is a schematic side elevation of a prior art circuit breaker having a vacuum interrupter assembly illustrating the basic operation of the assembly, a portion of which is applicable to this invention.

Referring to FIG. 1, there is illustrated a circuit breaker incorporating a vacuum interrupt apparatus 5. The circuit breaker 1 is preferably a drawn out threephase vacuum circuit interrupter which has controls on the front panel 7 for manually operating the circuit breaker and changing the state of the contacts to either an open or close condition. The circuit breaker 1 also has terminals 9 and 11 for one phase of the breaker and it has additional terminals not visible in FIG. 1 which correspond to the other two phases; each phase employing its own vacuum interrupter. The terminals such as 9 and 11 are for contacting corresponding terminals in an associated system that the circuit breaker is intended to control.

The circuit breaker 1 has a front low voltage portion 13 adjacent to the front panel 7 and a rear high voltage portion including the vacuum circuit interrupter 5. The high and low voltage portions are electrically insulated from one another by upper and lower isolators 15 and 17, respectively. Vacuum interrupter 5 encloses a pair of separable contacts, including stationary contact 21 and moveable contact 23 within a vacuum housing 25. The circuit breaker illustrated in FIG. 1 is a prior art design, but many of the features such as those just described and a major portion of the operating mechanism are applicable to the subject invention as well.

Details about the operating mechanism for moving the contacts 21 and 23 between an open and a closed position are described in detail in U.S. Pat. No. 4,743,876, which is owned by the assignee of the present application. U.S. Pat. No. 4,743,876 is herein incorporated by reference in its entirety. Briefly, as shown in FIG. 1, vacuum interrupter moving stem 27' is suitably connected to a rotatable contact bell crank 29. Contact bell crank 29 is pivotally mounted at upper pin 31. It is also rotatably mounted at lower pin 33. Pin 33 is slidably fastened in slot 35 of the operating rod 37. The operating rod 37 moves in response to the rotation of lever arm 38 about operating shaft 39. This motion occurs when a latchable operating mechanism (not shown in FIG. 1), more fully discussed in U.S. Pat. No. 4,743,876 cited above, is activated in response to an abnormal condition. When the operating rod 37 is placed in a closed position, operating rod 37 moves generally horizontally in the direction D. Pin 33 slides in slot 35, also in a generally horizontal direction. Bell crank 29 rotates in an arc-shaped path and the vertical component of this arc-shaped motion acts to lift vacuum interrupter moving stem 27' which moves moveable contact 23 until it seats against the fixed contact 21.

The operating linkage for opening the contacts 21 and 23, described in general terms, includes a trip latch having a series of links which are pivotally mounted with respect to operating shaft 39 and operating rod 37 such that when the trip latch falls from an initially upright position, operating rod 37 recedes back toward the trip latch and the breaker is then opened and contact 23 is separated from contact 21. A more thorough description can be found in U.S. Pat. No. 5,095,293 and U.S. Pat. No. 4,743,876, both cited above.

Figure 2:
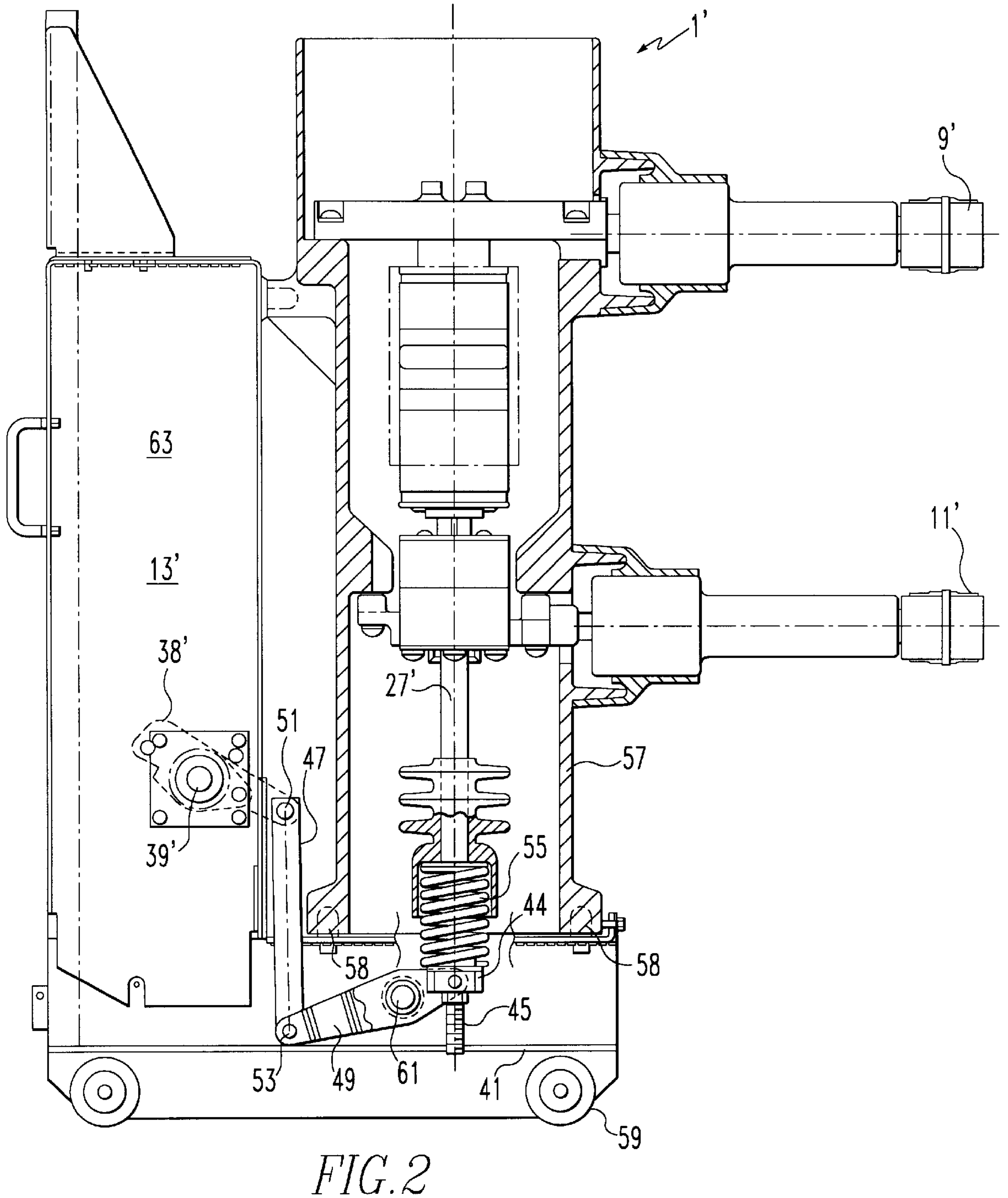
FIG. 2 is a schematic side elevation of a high voltage vacuum interrupter circuit breaker of this invention which employs the latchable operating mechanism of FIG. 1 with a new operating rod assembly shown with the breaker in the closed position.

The foregoing description provides a general understanding of the operation of the vacuum interrupter and the operating mechanism which interfaces with this invention, which is more fully illustrated in FIG. 2. Corresponding components in the designs illustrated in FIGS. 1 and 2 are shown with the same reference character primed in FIG. 2 to highlight their correspondence and minimize duplication in the description. The operating mechanism shown generally in FIG. 2 by reference characters 38' and 39', corresponding to the lever arm 38 and operating shaft 39, in the low voltage portion of the circuit breaker 13', is in all material respects identical to that shown in FIG. 1. The lever arm 38' is connected by pin 51 to an operating rod having two linked components 47 and 49 which are pivotally connected by pin 53. The lower linkage 49 of the operating rod is similarly pivotally connected at its other end to an extended portion of the moveable contact stem 27' on the exterior side of the bellow seal. A trunnion block 44 captures the spring 55 which is used to impart the necessary force to hold the contacts closed and open the moveable contact 23, which is not visible in FIG. 2, but can be appreciated by reference to FIG. 1. When the operating mechanism represented by reference characters 38' and 39' is in the latched position shown, the moveable contact is in the closed condition. A molded insulated housing 57 completely surrounds the vacuum interrupter and is anchored at locations 58. The insulation enables the vacuum interrupter carrying the high voltage portion of the unit to be supported much closer and in a much more compact arrangement with regard to the low voltage portion 13' and the exterior perimeter of the circuit breaker. Thus, the original isolators 15 and 17 are replaced with support means built into the molded insulated housing 57, shown in FIG. 2.

From the foregoing description of the design illustrated in FIG. 2 it can be appreciated that a method of determining the extent of deterioration of the contacts 21 and 23 is by identifying a measure of the length of travel of the drive stem 27', which seats and unseats the moveable contact 23. This measure is determined in accordance with this invention from the portion of the drive stem 27' that remains extended outside the housing 57 when the contacts 23 and 21 are in the closed position as will be explained in more detail hereafter. The more wear on the contacts, the greater the insertion of the drive stem 27' that is required to close the contacts. On the other hand, including a solid rigid extension on the operating rod linkages, 47 or 49, to provide an indicia of the desired measurement, in this embodiment, as was proposed in U.S. Pat. No. 5,095,293, does not provide an indication of contact wear because of the differences in operating rod assembly configurations illustrated in FIGS. 1 and 2.

Figure 3:
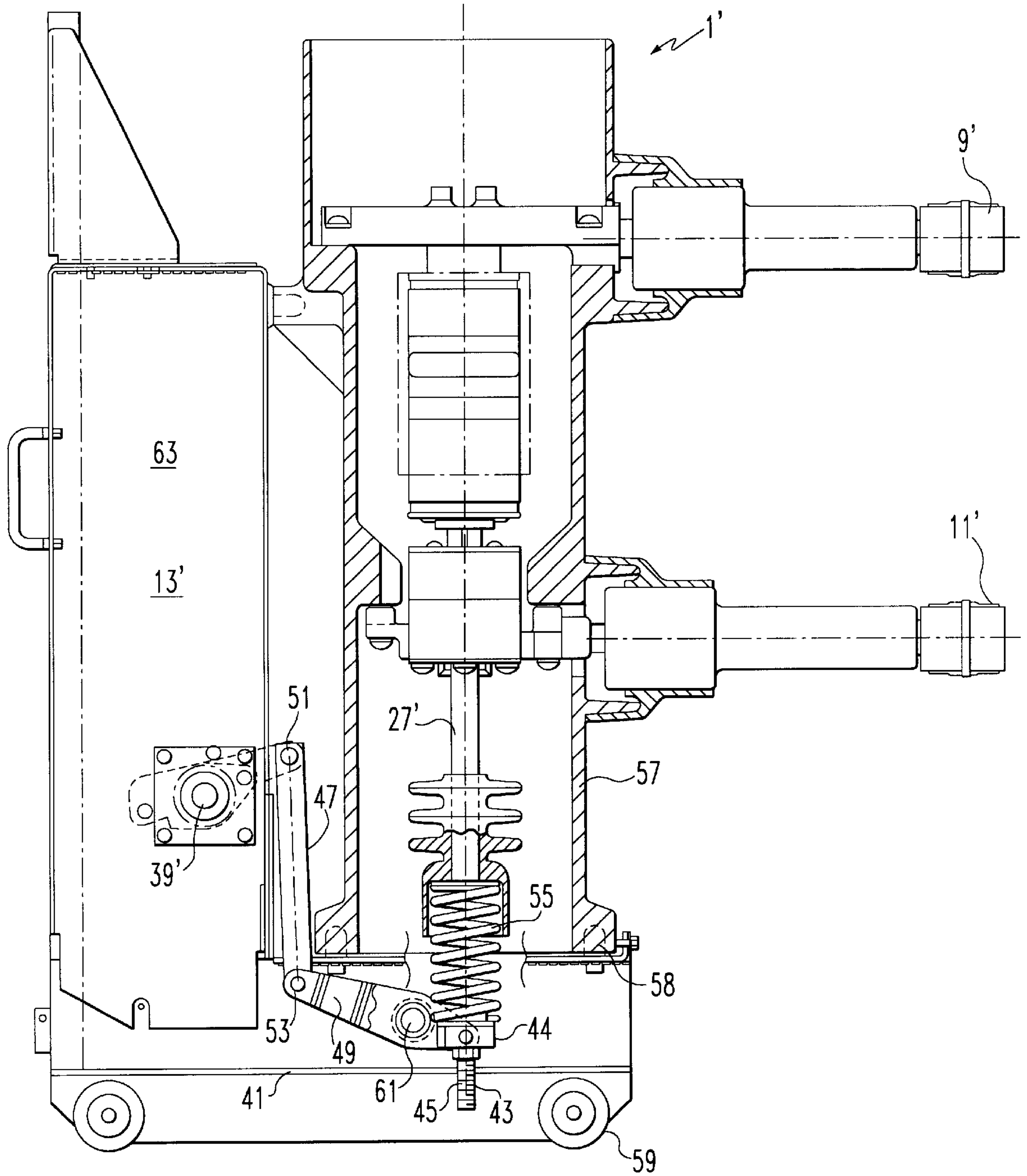
FIG. 3 is a side elevation of the view shown in FIG. 2 with the vacuum interrupter shown in the open position.

One method of establishing an indicia of the desired measurement is to provide an extension to the drive stem 27' that can be calibrated against a fixed reference when the contacts are closed. However, providing the drive stem 27' with a rigid extension creates an obstacle that can interfere with the secondary contacts and/or cabinet interface components. FIG. 3 is identical, in most respects, to FIG. 2 with the drive stem 27' and operating linkages 47 and 49 shown in a position that opens the moveable contact 23.

Figure 5:
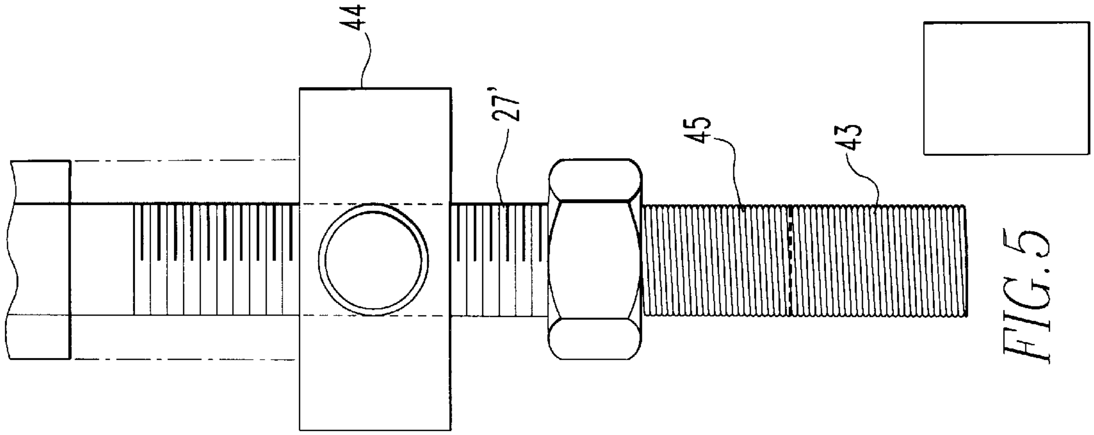
FIG. 5 is a schematic illustration of the erosion indicator of this invention fastened to the end of the drive stem of the moveable contact of the vacuum interrupter.

This invention provides a device that offers an accurate, inexpensive, simple and adaptive solution to the problem of monitoring contact wear inside a hermetically sealed interrupter, such as a vacuum interrupter, though it should be appreciated that this invention can be applied to any interrupter that uses a linearly moveable contact inside a sealed housing. As has been previously mentioned, since the contacts 21 or 23 cannot be seen, the most reliable method of gaging their condition is by measurement of the change in the extension of the end of the moving contact stem 27', which is a threaded stud, as shown in FIGS. 5 and 6.

Figure 4:
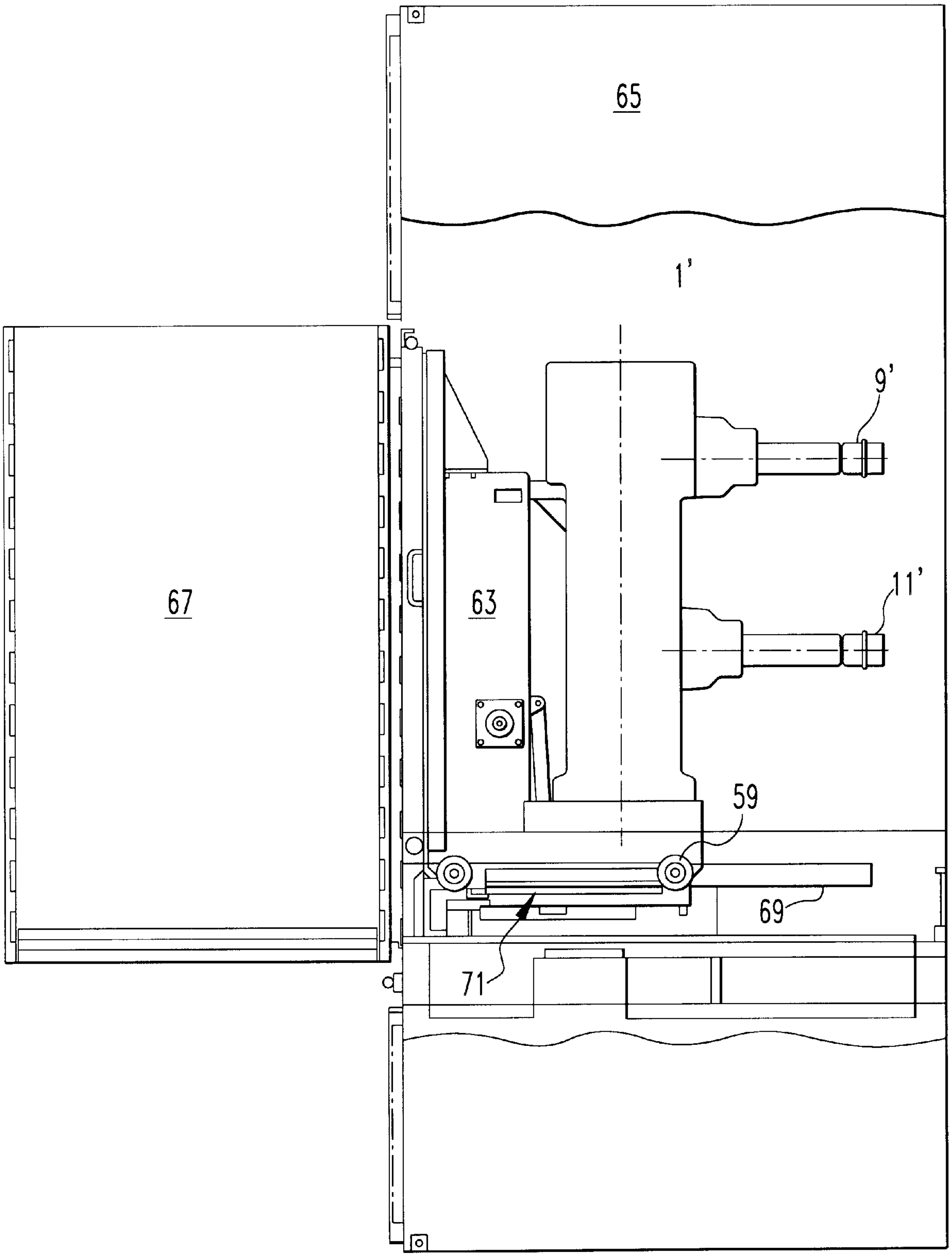
FIG. 4 is a side elevation partially cut away of a breaker cabinet with a breaker, designed in accordance with FIGS. 2 and 3, partially in place on its rails and engaged with its levering in and support components.

Attempts to use a solid erosion indicator such as that described in U.S. Pat. No. 5,095,293, attached to the end of the stem 27' supporting the trunnion block 44 have proved to create an obstruction to some of the other internal components, such as the secondary contacts and levering-in drive assembly in the breaker enclosure system. This can better be appreciated by reference to FIG. 4 which shows the breaker 1', previously illustrated in FIGS. 2 and 3, partially engaged within the breaker cabinet 65. A portion of the outside cabinet wall is shown broken away to better appreciate the insertion mechanism used to drive the breaker 1' through the cabinet door 67 and fully seat the contacts 9' and 11' in engagement with a bus bar and load contact supported along the rear of the cabinet. The wheels 59 of the breaker 1' ride on guide rail 69 and the undercarriage of the breaker engages a captured ball housing component of a crank, screw and captured ball design, within the cabinet breaker support structure 71, that is employed to drive the breaker drawer into and out of the cabinet. It should be appreciated that when the breaker is inserted or withdrawn from the cabinets, the contacts are in the open position to avoid arcing of the terminals 9' and 11' that mate with the corresponding contacts on the bus and load. With the breaker in the open position as illustrated in FIG. 3, it can be appreciated that any extension 43 to the stud 45 at the end of the contact drive stem 27' will extend below the bottom of the breaker pan 41 and interfere with some of the support structure and insertion mechanism 71 of the circuit breaker cabinets 65, illustrated in FIG. 4. One method of eliminating the interference would require a redesign of many of the internal parts of the circuit breaker or the cabinet 65. Instead of a substantial redesign of the circuit breaker 1 or cabinet, this invention employs the use of a flexible member 43, such as a spring or other resilient body, affixed to the end of the moveable contact stem 27' on the stud 45, to function as the erosion indicator as shown in FIGS. 2 and 3.

By using very small diameter wire wound in the form of a spring, a measure of flexibility can be achieved that will permit large deflections, while employing a mass low enough so dynamic effects are negligible. The “spring” body diameter is sized to grip on the threaded stud 45 which is the terminating end of the moveable contact stem 27'. The spring 43 screws over the thread of the stud to support itself in position. Preferably, the chosen small wire diameter matches effectively with the thread size on the stud. The flexible indicator shown in FIGS. 2 and 3 screws onto the stud until a distance of the spring protrudes beyond the bottom pan of the circuit breaker 41 with the contacts in a closed condition a distance equal to the manufacturer’s specifications for wear of the contacts 21 and 23, e.g., 3 mm. Preferably, the flexible indicator 43 is clamped or otherwise fixed to the stud 45 to maintain its calibration. When the flexible indicator 43 becomes flush with the bottom of the pan 41 as shown in FIG. 2, the vacuum interrupter must be replaced.

Figure 7:
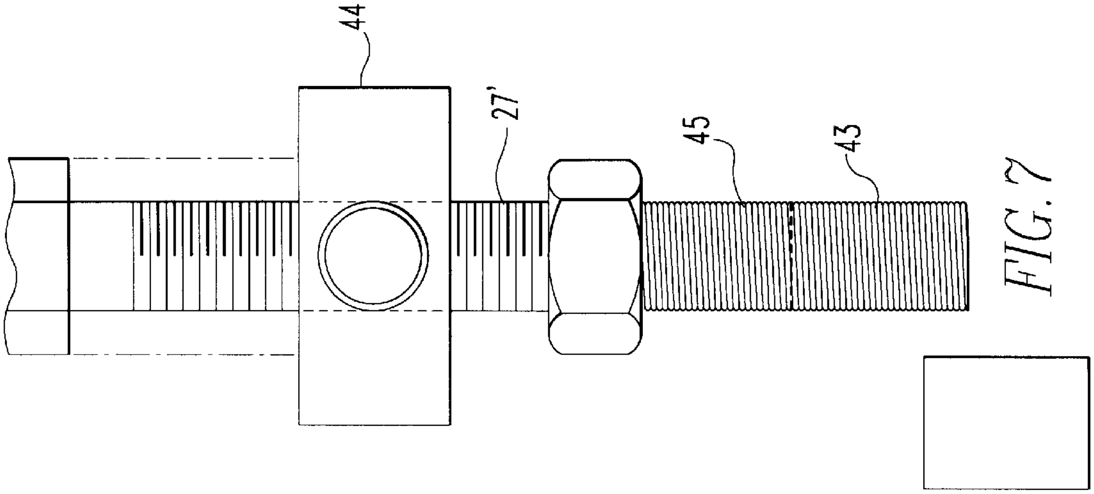
FIG. 7 is a schematic illustration of the erosion indicator of this invention, which forms a reference for FIG. 6.
Figure 6:
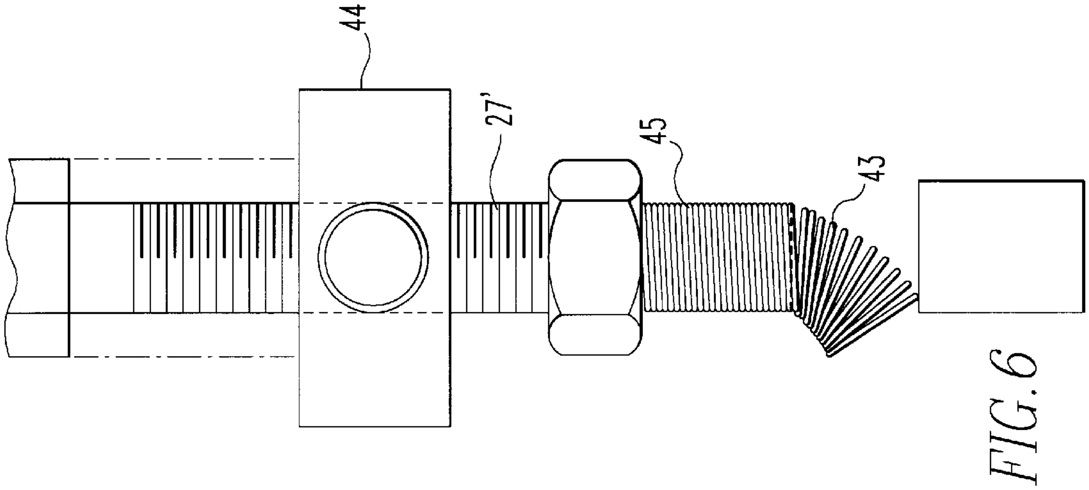
FIG. 6 is a drawing which illustrates the flexibility of the erosion indicator of this invention shown in FIG. 5.

FIG. 6 illustrates the flexibility of the indicator 43 as it moves past an obstruction, as previously discussed. When the indicator clears the obstruction, the flexible indicator 43 resumes the position shown in FIG. 7, as illustrated in FIG. 5. FIG. 3 is a schematic illustration of a breaker incorporating this invention showing the flexible member 43 fully extended with a moveable contact in its fully open position. FIG. 2 shows the breaker view of FIG. 3 with the contacts in the fully closed position. In this latter case, the extension of the flexible member 43 below the pan is equal to the manufacturer’s tolerance for contact wear when the contacts are new.

Since the threaded stud 45 shown in FIGS. 2 and 3, is directly and solidly connected to the vacuum interrupter moving contact stem 27, an accurate and reliable reading is obtained. As previously explained, when the vacuum interrupter is moved into or out of the enclosure, which forms the breaker cabinet, the vacuum interrupter should be in the open position, so that connections to or disconnections from the circuit are made with the circuit maintained in an open condition; which means the erosion indicator 43 protrudes much further below the bottom pan 41 than when the vacuum interrupter contacts are closed, as shown in FIG. 2, and will interfere with the secondary contacts and/or the cabinet insertion and withdrawal drive and support components. However, when such interference is encountered, as can be appreciated from FIG. 6, the flexible indicator 43 merely bends out of the way until it passes the obstruction and then returns to its original position. Insertion tests have confirmed the foregoing description and a high speed video has confirmed the dynamic operation of the flexible erosion indicator.

While specific embodiments of the invention have been described in detail, it will be appreciated by those skilled in the art that various modification and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit interrupter comprising:

a sealed container housing a medium having a lower electrical conductivity than air, wherein the container is impermeable to the medium;

a first stationary contact sealed within the container;

a first electrical conductor connected to the first stationary contact at one end, sealably penetrating the container and terminating at the other end in a first electrical connector;

a moveable contact sealed within the container and moveable between a first position, out of electrical communication with the first stationary contact, and a second position, in electrical communication with the stationary contact;

a second electrical conductor in electrical communication with the moveable contact at one end and terminating at the other end in a second electrical connector;

means for moving the moveable contact between the first and second positions in response to an actuation command, having a portion thereof which sealably extends through the container to the exterior thereof and moves parallel with the axis of movement of the moveable contact, and having a part of said portion extending outside the container;

a flexible, resilient contact wear indicator attached to said part and positioned so that when the moveable contact and stationary contact are in pristine condition and in the closed position, the contact wear indicator is in a first position with regard to a reference gauge and when the contacts have worn past a given tolerance and in the closed position, the contact wear indicator is in a second position with regard to the reference gauge.

2. The circuit interrupter of claim 1 wherein the medium is a vacuum.

3. The circuit interrupter of claim 1 wherein the second electrical conductor forms a portion of a drive stem which is included within the means for moving the moveable contact.

4. The circuit interrupter of claim 1 wherein the reference gauge is an opening which surrounds at least a portion of the wear indicator.

5. The circuit interrupter of claim 4 wherein the wear indicator is flush with or on the part side of the outer edge of the reference gauge when the contacts are in the closed position and out of tolerance.

6. The circuit interrupter of claim 1 including means for affixing the contact wear indicator to said part.

7. The circuit interrupter of claim 6 wherein the means for affixing the contact wear indicator to said part is a clamp.

8. The circuit interrupter of claim 1 wherein the contact wear indicator is a spring.

9. The circuit interrupter of claim 8 wherein the spring is threaded over an end of a drive stem forming the part of the means for moving the moveable contact.

10. The circuit interrupter of claim 9 wherein the end of the drive stem has a male thread.

11. The circuit interrupter of claim 10 where the spring is sized to match the pitch of the thread on the drive stem.

* * * * *